Patented Feb. 2, 1932

1,843,313

UNITED STATES PATENT OFFICE

FRITZ BAUMANN, OF LEVERKUSEN-ON-THE-RHINE, AND HERMANN FRIEDRICH AND LUDWIG ZEH, OF WIESDORF-ON-THE-RHINE, GERMANY, ASSIGNORS TO GENERAL ANILINE WORKS, INC., OF NEW YORK, N. Y., A CORPORATION OF DELAWARE

HYDROXYALKYLAMINO-ANTHRAQUINONES AND THEIR O-SULPHONIC ACIDS

No Drawing. Application filed April 16, 1928, Serial No. 270,573, and in Germany May 2, 1927.

The present invention relates to hydroxyalkylamino-anthraquinones and their O-sulphonic acids and to a process of preparing same.

We have found that hydroxyalkylamino-anthraquinones can easily be prepared by reacting with hydroxyalkylamines, as, for instance, hydroxyethylamine, hydroxypropylamine, etc., upon anthraquinone compounds being substituted at least once by a substituent of the group comprising halogen, $NO_2$, OH, and OR wherein R stands for an alkyl or aryl group. The hydroxyalkylamines may be used either in the pure state or in form of their solutions in solvents being inert to the starting materials such as water, pyridine, alcohol and the like. In the case that hydroxyanthraquinones containing at least two hydroxy groups in para-position to one another are applied as starting materials, it is useful to convert these hydroxyanthraquinones into the corresponding leuco derivatives, for instance, by means of sodiumhydrosulphite, and to condense the leuco derivatives with the hydroxyalkylamines. Obviously the reduction and the condensation with the hydroxyalkylamine may be performed in one step, for example, by adding sodium hydrosulphite to the hydroxyalkylamine which, in this case, is advantageously diluted with water. The temperature at which reaction takes place in all the cases above referred to varies in wide limits. The reaction is preferably performed at a temperature of from about 70° to about 130° C. When starting from anthraquinone derivatives containing two or more of the substituents above mentioned it is in many cases possible to replace only a part of them by hydroxyalkylamine residues, while the other substituents remain unchanged. The products thus obtainable form red to blue powders soluble in the usual organic solvents with red to blue colorations and soluble in concentrated sulphuric acid with red to olive yellow shades which change to voilet, blue or green by the addition of formaldehyde. They dye cellulose acetate silk beautiful red to greenish shades of good fastness properties.

We have further found, that the hydroxyalkylamino-anthraquinones can easily be sulphonated, for instance, by means of chlorosulphonic acid in the presence of a tertiary aromatic amine, whereby the $SO_3H$ residues enter the OH groups. These sulphonic acids have similar properties as the corresponding bases in view of their color and of the colorations of their solutions in concentrated sulphuric acid. They are valuable wool dyestuffs of red to greenish shades.

The following examples illustrate our invention without limiting it thereto:

*Example 1.*—10 parts by weight of α-chloro-anthraquinone are heated to boiling in 50 parts by weight of a 20% pyridine solution of hydroxy-ethylamine,

$$(CH_2OH.CH_2.NH_2)$$

under a reflux condenser until there is no further change in the coloration of the solution and a test portion no longer shows any halogen reaction. The separation of the dyestuff is effected by dilution with methyl alcohol.

The substance dissolves in sulphuric acid with a red coloration, its O-sulphonic acid dyes wool a yellowish red.

*Example 2.*—10 parts by weight of quinizarine are introduced, while stirring, into 60 parts by weight of a 30% aqueous solution of hydroxy-ethylamine, $(CH_2OH.CH_2.NH_2)$ and heated to 95° C. on the water bath. In consequence of salt formation a red solution is first formed and from test portions taken it will be found that after a short time the quinizarine spectrum has disappeared while blue crystals separate gradually from the solution. The reaction is continued until no further separation of crystals occurs and the melt is worked up after dilution with water.

The properties of the 1.4-di(hydroxyethyl-amino)-anthraquinone correspond to those of the dyestuff obtained in accordance with German Patent No. 235,312 Example 1.

*Example 3.*—10 parts by weight each of 1.4.5-tri-hydroxyanthraquinone and sodiumhydrosulphite are added at ordinary temperature to 100 parts by weight of an aqueous hydroxy ethylamine, $(CH_2OH.CH_2.NH_2)$ solution of 20% strength. The mixture is stirred at room temperature until a crystal magma has separated from the intermediately formed solution. The temperature is then raised very slowly to 80° C. and stirring is continued until a test portion under the miscroscope consists of uniform brownish yellow prisms. By oxidation of the isolated leuco compound 1.4-di(hydroxy-ethyl amino) - 5 - hydroxy - anthraquinone is obtained. It forms blue crystals, soluble in concentrated sulphuric acid with an olive yellow coloration which changes to bluish green at the addition of formaldehyde. It dyes cellulose acetate silk clear blue shades. By esterification with sulphuric acid a clear blue acid dyestuff is obtained.

*Example 4.*—20 parts by weight of leuco-1.4.5.8-tetra-hydroxyanthraquinone and 20 parts by weight of pure hydroxy-ethylamine, ($CH_2OH.CH_2.NH_2$) are heated to boiling in 160 parts by weight of ethyl-alcohol for about 1 hour until the starting material has been consumed. The greater part of the condensation product crystallizes out during the heating; after cooling the leuco compound which has separated in a pure state can be filtered, and oxidized after drying.

When oxidized, the resulting product, 1.4-di(hydroxy-ethylamino)-5.8-dihydroxy-anthraquinone, is obtained in form of blue crystals dissolving in concentrated sulphuric acid with a red coloration which changes to green by the addition of formaldehyde. It dyes cellulose acetate silk a clear bluish-green.

The O-sulphonic acid of this product dyes wool a bluish green shade.

We claim:

1. In the process of preparing hydroxy-alkylamino-anthraquinone-ortho-sulphonic acids, the step which comprises reacting with a hydroxyalkylamine upon an anthraquinone compound being substituted at least once by a substituent of the group consisting of halogen, $NO_2$, OH, and OR, wherein R stands for an alkyl or aryl group; whereby a solvent being inert to the starting materials may have been added.

2. The process, which consists in reacting with a hydroxyalkylamine upon an anthraquinone compound being substituted at least once by a substituent of the group consisting of halogen, $NO_2$, OH, and OR, wherein R stands for an alkyl or aryl group whereby a solvent being inert to the starting materials may have been added and sulphonating the products thus obtained.

3. In the process of preparing hydroxyalkylamino - anthraquinone - ortho - sulphonic acids, the step which comprises reacting with a hydroxyalkylamine upon a compound of the group consisting of hydroxyanthraquinones containing at least two hydroxy groups in the para-position to one another and their corresponding leuco-derivatives at a temperature between about 70 and 130° C., whereby a solvent being inert to the starting materials may have been added.

4. In the process of preparing hydroxyalkylamino - anthraquinone - ortho - sulphonic acids, the step which comprises reacting with a hydroxyalkylamine upon a leuco-derivative of a hydroxyanthraquinone which contains at least two hydroxy groups in the para-position to one another at a temperature between about 70 and 130° C., whereby a solvent being inert to the starting materials may have been added.

5. In the process of preparing hydroxyalkylamino - anthraquinone - ortho - sulphonic acids, the step which comprises reacting with a hydroxyalkylamine upon a leuco-derivative of a hydroxyanthraquinone which contains at least two hydroxy groups in the para-position to one another at a temperature between about 70 and 130° C., whereby a solvent being inert to the starting materials may have been added, and oxidizing the products thus obtainable.

6. The process, which comprises reacting with a hydroxyalkylamine upon a leuco-derivative of a hydroxyanthraquinone which contains at least two hydroxy groups in the para-position to one another at a temperature between about 70 and 130° C., whereby a solvent being inert to the starting materials may have been added, oxidizing and sulphonating the products thus obtainable.

7. In the process of preparing hydroxyalkylamino - anthaquinone - ortho - sulphonic acids, the step which comprises reacting with hydroxyethylamine upon a leuco-derivative of a compound of the general formula:

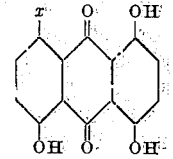

wherein $x$ stands for hydrogen or the OH group, whereby a solvent being inert to the starting materials may have been added, and oxidizing the products thus obtainable.

8. The process, which comprises reacting upon leuco-1.4.5.8-tetrahydroxyanthraquinone with a solution of hydroxy-ethylamine in ethylalcohol at the boiling point of the reaction mixture, oxidizing and sulphonating the product thus obtained.

9. As new products, the compounds of the probable general formula:

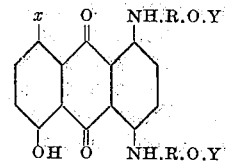

wherein R represents an alkyl residue, $x$ stands for hydrogen or the hydroxy group and Y represents hydrogen or the $SO_3H$ group, said compounds being red to blue powders of valuable tinctorial properties.

10. As new products, the compounds of the probable general formula:

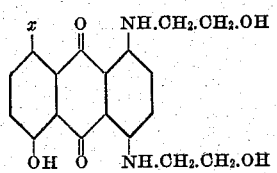

wherein $x$ represents hydrogen or the hydroxygroup, said compounds forming blue crystals, soluble in concentrated sulphuric acid with olive yellow to red colorations which change to bluish-green to green by the addition of formaldehyde, dyeing cellulose acetate silk clear blue to bluish green shades.

11. As a new product, the compound of the probable formula:

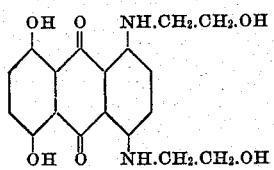

said compound forming blue crystals, soluble in concentrated sulphuric acid with a red coloration which changes to green by the addition of formaldehyde, dyeing cellulose acetate silk clear bluish green shades.

In testimony whereof we have hereunto set our hands.

FRITZ BAUMANN.
HERMANN FRIEDRICH.
LUDWIG ZEH.